Figure 1:
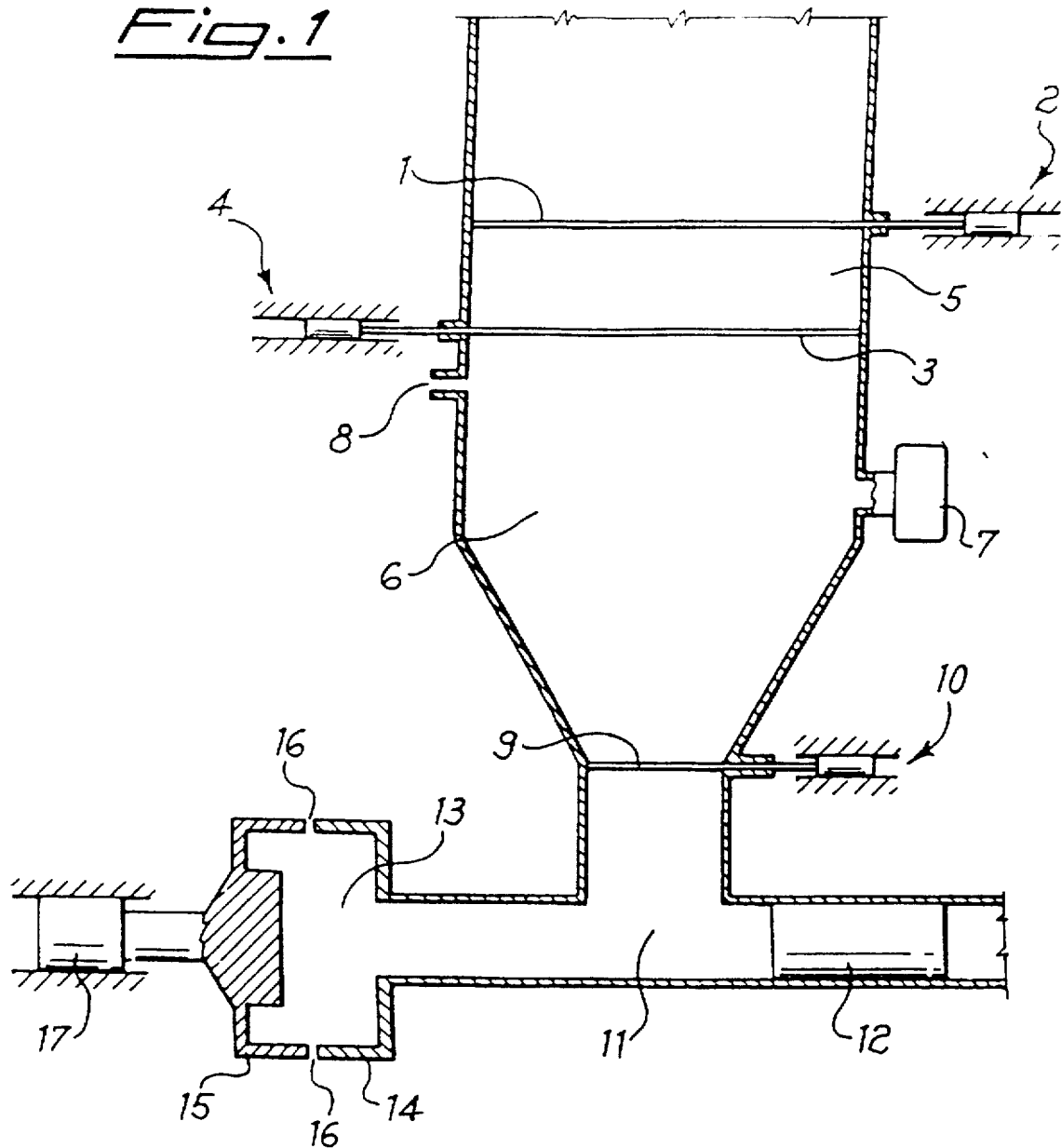

United States Patent [19]

Bastioli et al.

[11] Patent Number: 5,801,207

[45] Date of Patent: Sep. 1, 1998

[54] BIODEGRADABLE FOAMED ARTICLES AND PROCESS FOR THE PREPARATION THEREOF

[75] Inventors: Catia Bastioli, Novara; Vittorio Bellotti, Fontaneto d'Agogna; Gianfranco Del Tredici, Sesto Calende; Angelos Rallis, Novara, all of Italy

[73] Assignee: Novamont S.p.A., Novara, Italy

[21] Appl. No.: 708,207

[22] Filed: Sep. 6, 1996

Related U.S. Application Data

[60] Division of Ser. No. 469,566, Jun. 6, 1995, Pat. No. 5,589,518, which is a continuation-in-part of Ser. No. 384,515, Feb. 6, 1995, abandoned.

[30] Foreign Application Priority Data

Feb. 9, 1994 [IT] Italy ..................... MI94A0228

[51] Int. Cl.$^6$ ..................... C08J 9/24; C08J 9/36
[52] U.S. Cl. ..................... 521/84.1; 521/53; 521/54; 521/55; 521/57
[58] Field of Search ..................... 521/84.1, 53, 55, 521/54, 57

[56] References Cited

U.S. PATENT DOCUMENTS

| | | | |
|---|---|---|---|
| 5,208,267 | 5/1993 | Neumann et al. | 521/84.1 |
| 5,288,765 | 2/1994 | Bastioli et al. | 521/84.1 |
| 5,308,879 | 5/1994 | Alamatu et al. | 521/84.1 |
| 5,360,830 | 11/1994 | Bastioli et al. | 521/84.1 |
| 5,413,855 | 5/1995 | Kolaska et al. | 428/532 |
| 5,506,277 | 4/1996 | Griesbach, III | 521/84.1 |

FOREIGN PATENT DOCUMENTS

| | | |
|---|---|---|
| 0 587 078 A1 | 3/1994 | European Pat. Off. . |
| 42 36 717 | 1/1994 | Germany . |

*Primary Examiner*—Morton Foelak
*Attorney, Agent, or Firm*—Bryan Cave LLP

[57] ABSTRACT

Biodegradable foamed articles having density comprised from 5 to 300 kg/m$^3$ obtained by agglomeration of foamed particles having composition comprising a thermoplastic starchy material or a thermoplastic natural polymer capable of absorbing water when converted into the thermoplastic state, a thermoplastic polymer, and water.

21 Claims, 1 Drawing Sheet

BIODEGRADABLE FOAMED ARTICLES AND PROCESS FOR THE PREPARATION THEREOF

This is a divisional of U.S. application Ser. No. 08/469,566, filed Jun. 6, 1995, now U.S. Pat. No. 5,589,518, which is a continuation-in-part of U.S. application Ser. No. 08/384,515, filed Feb. 6, 1995, now abandoned.

The present invention relates to biodegradable foamed articles, to the process for their preparation and to specific shaped articles.

In the sector of foamed materials, used, in particular, for protective packages, the need is felt to higher and higher extent, for replacing foamed polystyrene with materials capable of satisfying the more and more stringent biodegradability requirements.

For that purpose, the use of starch-based materials was proposed in the past.

European patent application EP-A-0 087 847 discloses a process for preparing starch-based foamed articles, consisting in heating starch or starch containing materials, in an extruder in the presence of 10–30% of water by weight and of a foaming agent, followed by extrusion.

European patent application EP-A-0 375 831 discloses foamed articles formed of high-amylose starch, which display good mechanical characteristics and closed-cell-structure. These foamed articles are prepared by extrusion in the presence of water, at temperature comprised from 150° to 250° C., optionally followed by a thermo-forming treatment.

International patent application published with No. WO 91/02023 discloses foamed articles of biodegradable plastic material, prepared by extruding a starch containing composition and a synthetic polymer selected from ethylene/vinyl alcohol and ethylene/acrylic acid copolymers, in the presence of a polymeric acid and sodium bicarbonate as foaming agent.

Operating according to the methods known from the prior art, it is difficult to prepare foamed articles having complex shapes and high thickness. Furthermore, the obtained foamed articles do not possess in general satisfactory stability.

From U.S. Pat. No. 5,300,333 it is known to prepare food containers from heat-expanded grains(popcorn) bonded together by a bonding agent formed of starch, or a starch paste and similar products.

The popcorn beads are combined with the bonding agent and the mixture is foamed into a selected container shape for holding and insulating foods.

To add strength to the wall structure, a biodegradable reinforcing structure e.g. a cotton scrim is used.

The purpose of the present invention is of providing biodegradable foamed articles which do not show the drawbacks affecting the prior art, and are endowed with good mechanical characteristics, in particular good resilience and excellent cushion properties.

It has now been found that it is possible to prepare biodegradable foamed articles endowed of valuable properties by agglomeration of foamed particles having composition comprising:

from 30 to 98,5%, preferably from 50 to 95% by weight of thermoplastic starch or a thermoplastic natural polymeric substance, which when converted into the thermoplastic state is capable of absorbing more than 15% by weight water;

from 1.5 to 70%, preferably from 2 to 40 by weight of a thermoplastic polymer, and from 0 to 20%, preferably from 1 to 18% by weight of water on the weight of the composition.

The foamed particles have a density comprised from 0.003 to 0.1 g/cm$^3$ and a closed cell structure.

The particles can have different shapes and sizes and behave as loose fillers. In particular, the following shapes can be conveniently used:

substantially spherical shapes with diameter preferably comprised between 0.5 and 20 mm and more preferably from 1 to 10 mm;

strands with diameter preferably comprised between 0.5 and 50 mm and length greater than 2 diameters, preferably comprised from 2 to 100 diameters;

geometrical forms having different shapes and sizes, for example "0", "8", "A", "S"; "C" or "V" shaped forms.

In preparing the foamed articles by agglomeration of the foamed particles having the above composition care has to be taken to avoid the tendency of the particles to collapse when contacted with the aqueous emulsion used to bond together the particles. The compression applied to the particles to bond and/or sinter the same is another factor which can cause particle collapsation and dishomogieneit of the mechanical properties.

Notwithstanding the collapsation above expected difficulties it has surprisingly been found that it possible to agglomerate the particles obtaining shaped article endowed of valuable properties.

The articles of the invention have density comprised from 5 to 300 kg/m$^3$, preferably from 10 to 100 kg/m$^3$ and are endowed with good resilience and excellent cushion properties i.e. capability of absorbing shocks without damaging a packed article.

The natural polymeric substance which can be used to prepare the foamed particles preferably is starch which can be native starch, preferably corn starch, potato starch, mais starch or tapioca starch, pea starch, high-amylose starch grades containing more than 30% amylose, or waxy starch grades.

Furthermore, physically and chemically modified starches can be used, such as ethoxylated starches, oxypropylated starches, acetate starches, butyrate starches, propionate starches with a substitution degree comprised within the range of from 0.1 to 0.5, cationic starches, oxidized starches, crosslinked starches, gelified starches, starch complexed with polymers capable of yielding "v"-type complexes, e.g., with ethylene/vinyl alcohol, ethylene/acrylic acid, ethylene/maleic anhydride copolymers, ethylene/ethyl acrylate/maleic anhydride copolymers, ethylene/ethyl acrylate/maleic anhydride terpolymers, or with aliphatic polyester/urethane, polyether/urethane copolymers. Grafted starches, degraded starches, destructured starches are also included.

Native starch is normally used without submitting it to any preliminary dehydration, with its water content of approximately 6–20% by weight.

Examples of natural polymeric substances different from starch are:

gelatins;

pectins;

alginates;

proteins (zein, gluten, soy proteins casein), natural resins based on shellac, rosin acid.

natural rubbers

Gelatins, natural proteins and natural rubbers are the preferred natural substances.

The transformation of starch and the natural substances of the above indicated type into the thermoplastic state is carried out in heated extruders (extrusion-cooking), or in any devices which may secure temperature and shear stress conditions which are suitable to cause the material to become thermoplastic, by operating in the presence of water, at a temperature generally comprised within the range of from 80° C. to 210° C.

The presence of one or more thermoplastic polymers in the composition of the above said foamed particles makes it possible to improve the melt strength of the composition and to obtain foamed articles endowed with good resilience and low moisture sensitivity.

The thermoplastic polymer which can be used as components of foamed particles are selected from:

i. Polymers from natural origin, either modified or non-modified, in particular starch esters such as starch acetate, propinate and butyrate, cellulose esters, as cellulose acetate, cellulose propionate or butyrate, these esters having a substitution degree comprised within the range of from 1 to 2.5, possibly plasticized; alkyl cellulose, in particular methyl cellulose, and, furthermore, carboxymethylcellulose, chitosan, pullulan or caseinates, proteins, polyaspartates and their copolymers, polyglycerols and their copolymers.

ii. Biodegradable polymers of synthetic origin, or obtained by fermentation, in particular polyesters, as homo- and copolymers of aliphatic $C_2$–$C_{24}$ hydroxy acids, or the corresponding lactones or lactides, and furthermore polyesters derived from dyfunctional acids and aliphatic diols such as, e.g.:

poly(epsilon-caprolactone), or its graft or block copolymers, the reaction products of caprolactone oligomers or polymers with aromatic or aliphatic isocyanates, lactic acid or lactate polymers, glycolic acid or polyglycolide polymers, lactic acid and glycolic acid copolymers, copolymers between lactic acid and caprolactone and lactic acid/caprolactone/glycolic acid terpolymers.

polyalkylencarbonates, poly (1,4-dioxanone);

polyhydroxybutyrate or polyhydroxybutyrate-valerate polyalkylene succinate and, in particular, polyethylene- or polybutylene succinate, polyalkylene azelate, polyalkylenebrasilate, polyethylene- or polybutylene brasilate and copolymers thereof, optionally copolymerized with aliphatic or aromatic isocynates, possibly with the molecular weight increased by using chain extenders, or block copolymerized with saccharides, polysaccharides, polyvinylalcohol, polyglycerols.

iii. Polymers capable of forming "V" type complexes with amylose, or polymers containing hydrophilic groups intercalated with hydrophobic sequences, such as:

ethylene-vinyl alcohol copolymers containing up to 50% by weight, preferably 10–44% by weight, of ethylene units, oxidised ethylene-vinyl alcohol copolymers, or ethylene-vinyl alcohol copolymers terminated with fatty acids, or grafted with polycaprolactone or other polyesters, or modified with acrylic of methacrylic monomers and/or pyridinium, ethylene-vinyl acetate copolymers, which may also be partially hydrolysed, ethylene-acrylic esters copolymers, ethylene-acrylic esters-maleic anhydride or ethylene-vinyl acetate-glycidyl methacrylate terpolymers, ethylene copolymers with unsaturated acids, such as acrylic acid, methacrylic acid, crotonic acid, itaconic acid, maleic anhydride, in particular ethylene-acrylic acid copolymers containing 5–50%, by mol, and preferably 10–30%, by mol, of units derived from acrylic acid, ethylene terpolymers with vinyl acetate, which may be either totally or partially hydrolysed, and with acrylic or methacrylic or crotonic or itaconic acid, aliphatic 6-6, 6-9 or 12 polyamides, aliphatic polyurethanes, random or block polyurethane/polyamide, polyurethane/polyether, polyamide/polyester, polyamide/polyether, polyester/polyether polyurethane/polyurea and polyurethane/polyurea/polyester copolymers;

iv. Polymers capable of forming hydrogen bonds with starch, in particular poly(vinyl alcohol) in various hydrolysis degrees, from polyvinylacetate possibly modified with acrylates or methacrylates, poly(vinyl alcohol) previously plasticized or modified in order to reduce the melting point thereof, possibly containing gelling agents, as boric acid, borates or phosphates, vinyl acetate copolymers (in various hydrolysis degrees) with vinylpyrrolidone or styrene, polyethyloxazolines, polyvinylpyridine, polyoxyalkylenes, polyaspartates.

Preferred thermoplastic polymers are poly(vinyl alcohol) in its various degree of hydrolysis from polyvinyl acetate, the copolymers of an olefinic monomer preferably ethylene, with a monomer selected from vinyl alcohol, vinyl acetate, acrylic acid and methacrylic acid; aliphatic polyesters, such as polycaprolactone, poly(butylene succinate) and their copolymers, polyester/polyurethane, polyester/polyurethane/polyurea copolymers, aliphatic polyamides, polyalkylenoxides, polyureas, carboxylmethylcellulose, chitosan, caseinates, polyaspartates, polyglycerols.

The foamed particles or loose fillers used to prepare the foamed articles of the present invention are preferably obtained with the aid of a nucleating agent.

The amount of such a nucleating agent in the foamed material is comprised within the range of from 0.005 to 5% by weight, still more preferably from 0.2 to 2% by weight.

Useable nucleating agents are, e.g., inorganic products, as talc (magnesium silicate), calcium carbonate, possibly previously superficially treated with silanes or titanates.

Furthermore, organic fillers can be used, as yeast shells from sugar beet processing, dried, ground and powdered sugar beet flesh, wood powder, cellulose powder.

The nucleating agent can be added according to various procedures:

a) in the case of the direct foaming of the particles (single step process) the nucleating agent is fed together with the other components of the mixture;

b) in the case of a two-steps process the nucleating agent can be fed in the first step of foamable pellets production. It can be added to either as such or in form of master-batch. In such case, the master-batch may contain from 10 to 50% by weight of one or more fillers.

The foamable particles can furthermore contain one or more slip agent (s) and/or dispersants having a hydrophilic/lipophilic balance index ("HLB") within the range of from 3 to 25 said agents or dispersants being preferably comprised within the range of from 0.01 to 5% by weight, more preferably from 0.1 to 3% by weight.

The foamable particles can also contain one or more plasticizer(s). When used, said plasticizes can be present in amounts comprised within the range of from 0.5 to 20% by weight, preferably from 0.5 to 5.0% by weight.

Useable plasticizes are, e.g., those disclosed in published International Patent Application Publ. No. WO 92/14782, the content of which is incorporated hereto by reference.

Particularly suitable for use as plasticizes are glycerol, sorbitol, mannitol, erythritol, low molecular weight poly (vinyl alcohol), their oxyethylated and oxypropylated derivatives, and, furthermore, urea.

Furthermore, the foamable particles can contain one or more flame retardant(s), which can be added to the mixture used in order to prepare the particles themselves or, alternatively, can be added to the foamable particles as a masterbatch, in particular in combination with the nucleating agent.

When they are used, said flame retardants are present in amounts comprise within the range of from 0.1 to 20% by weight, preferably of from 1 to 10% by weight, still more preferably of from 2 to 5% by weight.

The flame retardants can be selected from those derived from phosphorus containing, sulphur containing compounds or halogenated products. For example, triphenyl phosphate, tributyl phosphate, tricresyl phosphate, tributoxyphenyl phosphate, melamine pyrophosphate, ethylene diamine, ammonium polyphosphate, guanidium phosphate, tetrabromophthalic anhydride, halogenated paraffins, diphenyl oxide with different bromination degrees, ammonium sulphate, ammonium sulfamate, are suitable for the intended purpose. Ammonium sulphate, ammonium sulfamate, ammonium polyphosphate, guanidium phosphate and melamine pyrophosphate, guanidinium phosphate and melamine pyrophosphate are particularly advantageous.

Other useable flame retardants are aluminium hydroxide, antimony oxide, ammonium perborate, ammonium octamolybdate.

For particular applications, the presence may be required in the foamed particles of repellent substances to rodents, which can be added to the mixture used for preparing the foamed particles, or can be added to the foamed particles as active principle containing microcapsules, or as a masterbatch, in particular in combination with the nucleation agents and/or flame retardants.

For that purpose, such substances as N,N-diethyl-m-toluamide, diethylphenyl acetamide, 2-decanal, ammonium chloride, potassium chlorate, terpenoids, cycloheximide, diguanidinoazaheptadecane, can be used. Terpenoids, and, in particular, menthol and limonene are preferred.

When used, these repellents are present in amounts comprised within the range of from 1 to 3% by weight.

The foamed particles forming the foamed articles of the invention can be prepared directly by extrusion foaming the starch based composition, carried out using a single screw or twin screw extruder.

Such an extrusion process, carried out in the presence of water added in amount comprised within the range from 2 to 20% by weight, causes the starch contained in the composition to get destructured. The water content could be controlled by means of a venting system, so as to have a total water content at the nozzle, preferably comprised within the range of from 1 to 20% by weight.

As an alternative, granules can be used of a thermoplastic starch previously destructured according to the techniques known, e.g., from published International Patent Application WO 92/02363 and WO 92/14728, the contents of which are herewith incorporated by reference.

The above foaming processes are carried out at temperatures generally comprised within the range from 150° to 250° C., with residence times in extruder generally from 10 seconds to 15 minutes.

The extruder-head is provided with dies with one or more holes of various calibers and various shapes in function of the shape to be conferred to the foamed particles.

The head is also provided with a multi-blade cutting apparatus which rotates at controlled speed allowing to obtain either particles of substantially spherical form or strands of the desired length and profile.

The shear values at the nozzle generally are higher than 500 s$^{-1}$, preferably higher than 1000 sec$^{-1}$ and more preferably higher than 3000 s$^{-1}$. A preferred method for preparing the foamed particles is that one disclosed in Italian application MI 94A/001725 whose description is herewith incorporated by reference. According to this method, the starch-based composition is extruded at temperature from 150° to 200° C. in the presence of added water used in amounts from 5 to 20% by weight. The pellets thus obtained are extrusion a foamed in a single screw extruder developing specific energy capable of lowering the intrinsic viscosity of starch to values inferior to 1.3 dl/g (in dimethyl sulfoxide). The foamed particles have picnometric density lower than 0.032 g/cm$^3$ and ethanol soluble fraction lower than 20% by weight.

Another method for preparing the foamed particles consists of a treatment of compressing/depressurizing foamable particles having a size comprise within the range of from 20 µm to 1 mm, as diameter. Said foamable particles can be obtained, e.g., by extrusion through multi-bore dies and subsequent head cutting, of by grinding larger-size granules.

These foamable particles are submitted to pressures higher than the one of the moisture in equilibrium with water contained in the material, at temperature comprised from 40° to 200° C., followed by a fast depressurizing.

Still another method for preparing the foamed particles consists in submitting the above type of foamable particles to a heating treatment by microwaves.

As indicated, the foamed particles and loose fillers can have different shape and size. The spheroidal particles can have diameter from 0.1 and 20 mm. The strands can have diameter from 0.1 and 20 mm and from 2 to 100 diameters of length.

The density of the particles is comprised in the range from 0.003 to 0.1 g/cm$^3$.

The foamed biodegradable articles of the present invention can be prepared by various agglomeration techniques preferably comprising:

a) subjecting the foamed particles to compression under heat-treatment;

b) submitting the foamed particles to a treatment with at least one coating agent capable of modifying the surface characteristics in order to render the particles capable of stably interacting and bonding each other when they are caused to come into mutual contact under compression; and, subsequently, keeping the coated foamed particles into intimate contact under compression conditions, during a long enough time to cause the same to get bonded.

The good resilience properties of the foamed particles enable them to withstand collapsing phenomena when they are brought into intimate contact under compression conditions.

Coating agents useable in the agglomeration processes according to the present invention are:

i. liquid water, possibly with the addition of salts and/or additives, or water in the vapour state;

ii. aqueous solutions, suspension and/or emulsion of either natural or synthetic polymeric or monomeric substances;

iii. solvents with high enough "wetting power";

iv. non aqueous solutions, suspensions and/or emulsions of either natural or synthetic polymeric or monomeric substances, in said solvents;

v. polymers and monomeric substances with thermal transition point less than 130° C., preferably less than 90° C.

Examples of coating agents which can be used in aqueous solution, suspension or emulsion are:

poly(vinyl acetate);

poly(vinyl butyrate);

copolymers of vinyl acetate or vinyl butyrate with one or more monomer(s) selected from vinyl esters, acrylates, methacrylates, allyl derivatives, pyridinium salts, acrylonitrile, acrylamide, vinyl pyrrolidine, vinyl pyridine, vinyl imidazoles, which can possibly be either partially or totally hydrolysed;

poly(vinyl acetate) or poly(vinyl butyrate) grafted with aliphatic polyesters, such as polycaprolactone, and/or lactic acid polymers, and/or fatty acids;

high- or low-hydrolysis-degree poly(vinyl alcohol), possibly pre-treated with plasticizes and/or admixed with gelation agents, such as, e.g., boric acid, borates, titanates;

poly(vinyl alcohol) modified by acetalization, etherification, esterification;

block copolymers of poly(vinyl alcohol) with poly(vinyl acetate or styrene);

fatty acid capped poly(vinyl alcohol);

poly(vinyl alcohol) grafted with polyoxyethylene and/or polyoxypropylene;

native starch from any origins, possibly hydroxyalkylated, cationic, oxidized, crosslinked, hydrolysed starch, or modified starch with ester, ether and/or phosphate groups;

destrins;

casein and caseinates;

alkyl cellulose, hydroxyalkyl cellulose and cellulose esters, such as cellulose acetate and carboxymethyl cellulose, possibly plasticized and/or modified with aliphatic esters, as caprolactone;

natural rubber latex;

natural gums (vegetable hydrocolloids), such as gum arabic, possibly grafted with acrylamide, acrylonitrile, styrene or acrylic esters;

alginic acid, alginates, abietinic acid, rosin resin, agar-agar, guar gum, carragenane, xanthan gum, pullulan, chitosan, shellac, animal gelatins, proteins;

polyglycerol and its derivatives with polyesters, polyurethanes and polyureas and grafted copolymers thereof;

ammonium or sodium salts of ionomeric polymers derived from poly(acrylic acid), ethylene/acrylic acid copolymers, acrylamide/acrylic acid copolymers, poly(styrene sulphonic acid), polyaspartates;

polyaspartates and their copolymers;

homo- and co-polymers of prevailingly aliphatic character, in particular polyurethanes, polyureas, polyureas/polyester/polyurethane copolymers, polyamides, polyesters, such as poly(caprolactone), poly(lactic acid), poly(hydroxybutyrate-valerate), poly(butylene), succinate, polyalkylene azelates and brasilates, polyalkylenecarbonates, and their copolymers with partially substituted polyfunctional alcohols, also in presence of saline groups or of chain extenders.

epoxi resins containing blocks of polyesters, polyester/polyether, polyethers, terminated with epoxi groups.

The above listed substances are active either when added directly to the formulations used to prepare the foamed particles (use in bulk) or as coatings of the particles themselves, when using solutions, suspensions, emulsions or melted powders.

As regards the use in bulk, the list of the active substances has to be broadened to comprise the thermoplastic polymers normally used in the compositions for the foamed particles, and mixtures of said polymers, to confer resilience and water resistance to the particles. To this effect, polymers and copolymers are preferred which are capable of forming "V" type complexes with amylose; in particular the copolymers urethane/aliphatic esters and the ethylene/acrylic acid esters/maleic anhydride terpolymers, ethylene/vinylalcohol, polyurea/esters, polyurea/esters/urethanes copolymers.

The coating agents can be applied to the particles by using solutions, suspensions or emulsions. Particularly suitable are the polymer suspensions and emulsions, specially the aqueous emulsions of polymers and copolymer capable of interacting with starch with formation of complexes or bonds of hydrogen type or others.

Among the above emulsions, particularly effective are the emulsion of aliphatic or aromatic polyesters, preferably polyurethane/aliphatic polyester, polyurea/aliphatic polyester/polyurethane, aliphatic polyester/aliphatic urethane ethylene/vinyl alcohol copolymers; aliphatic polyesters; polyvinylalcohol at various degree of hydrolysis, polyvinylacetate; natural rubbers; epoxi resins.

Depending on the agent used to obtain the bonding of the foamed particles, the foamed article of the present invention can be prepared according to various procedures.

Four routes are essentially followed:

a) use in bulk of the bonding agents;

b) impregnation with solutions;

c) coating of the foamed particles by means of emulsions or suspensions;

d) coating the foamed particles with powdered substances.

a) Use in bulk

The substances usable as thermoplastic polymers in the formulations for preparing the foamed particles are those indicated as bonding agents are capable of conferring the particles, besides better mechanical properties, the capability of sintering by thermal effect only.

Said substances have to be present in the compositions in amounts from 5 to 70% by weight, preferably from 10 to 50% and more preferably from 20 to 40% with respect to the total weight of the composition.

The foamed particle can be conveied into the preheated mould or can be heated with hot air or other systems to the desired temperature, after loading into the mould.

As indicated, the water content of the foamed particle can vary from 0 to about 20% and preferably from 1 to 18% by weight. The optimum quantity of residual water is tied to the nature and amount of the synthetic thermoplastic component and also to the sintering temperature.

Excessive amounts of water can cause colapsation phenomena, especially within the core of the moulded article.

Law water contents, for example less than 5% by weight, are used preferably with compositions having high contents of synthetic components (more than 20–25%).

Normally the reduction of volume applied in the shaping step is 20–500% preferably 30–300% with respect to the original volume.

The moulding temperature is higher than the thermal transition temperature (Tm or Tg) of the most significant synthetic component present. Said temperature is generally comprised from room temperature and 200° C. and maintained at the selected value enough time to cause the sintering of the particles.

The shaped article is then cooled and removed using a flow of air at a temperature lower than the most representative thermal transition points and/or by using demoulders.

The demolding temperature can be comprised from −20° to 50°, preferably from 0° to 30° C.

b) Impregnation with solutions

This technique is applied to foamed particles not easily sinterable and having a limitated tendency to collapse in the presence of the specific solvent used. The particles can be immersed directly into the solution when this is sufficiently diluted or can be treated, with the various available systems for surface deposition.

The treated particles can be:

1) completely dried off from the solvent up to obtain flowable particles. In this case, the next step consists in the sintering process described above. In the case of immersion, the solvent removal could require also a first mild centrifugation to avoid the possible particle collapsation. In any case, it is preferable that the drying is carried out with such a ventilation as to maintain the mass in continuous movement to avoid undesired agglomeration phenomena before the step of filling the mould.

2) not dried or only partially dried particles. In this case, the subsequent step is a sticking/sintering step. Namely, it is necessary to complete the drying during the shaping step or subsequently, to obtain a stable shaped article. The bonding step needs a temperature range from room temperature to 150° C., preferably from r.t. and 100° C. and could require also a system for circulation air. A stabilization step, if needed, can be carried out with or without ventilation, in a temperature range from room temperature to 100° C., preferably between room temperature and 80° C. The solutions generally have solute concentration from 0.5 to 40% by weight, preferably between 2 and 20%. The solvents used are those typical of the specific species dissolved, preferably low boiling solvents such as acetone, hexane, ethyl ether, tetrahydrofurane, methylene chloride, optionally also water. The impregnation technique allows to utilize substances not showing any particular affinity with starch, substances which, if added in the bulk, could create dishomogeneity problems, penalizing the subsequent step of foaming. Following solutions can be cited as example: solutions of aliphatic polyesters such as polyalkylenesuccinates or polyhydroxyalkanoates, polyalkylenecarbonates, polyester/urethane and/or polyether/urethane copolymers, polyester/polyurea, polyester/polyurea/ polyurethane copolymers, polyvinyl alcohol, starch or modified starch, destrins, agarose carragenanes, other glycanes, carboxymethylcellulose, alginates, pectines, polyoxyalkylenes and derivatives thereof, polyglycerols, polyaspartates. The solutions can contain fillers and additives.

c) Impregnation of foamed particles with emulsions

Also this technique is applied to foamed particles not easily sinterable, having a limitated tendency to collapse in the presence of the emulsion medium which preferably is water. The particles treatment may be carried out using any coating technique, but the treatment using the emulsion in nebulized form is preferred.

The treated particles can be:

1) Completely or partially dried from the emulsion medium to the point of obtaining flowable particles. In this case the next step consists in the sintering step as above reported. In any case, it is preferred that the drying be carried out with such a ventilation as to avoid undesired agglomeration phenomena before filling the mould. At the end of the cycle, the particles form a fluid mass that can also be stocked in silos. The sintering process is similar to the one described in a)

2) Not dried or only partially dried particles. In this case the next step is the binding/sintering step; because the particles do not result flowable, it is necessary to complete the drying during the shaping step or successively. The bonding step is carried out at temperature from room temperature to 150° C. and preferably from room temperature to 100° and could require also a system for circulating air. A stabilization step, if needed, can also be carried out with or without ventilation and in a temperature range from room temperature to 100° C., preferably from room temperature and 80° C.

Among the listed substances, particularly suitable as coating agents are the emulsions of polyvinyl acetate, ethylene-vinylacetate copolymers, aliphatic esters/aliphatic urethane copolymers especially those deriving from tetramethylenadipates, succinates or caprolactone and aliphatic diamines and disocynates such as isophorone disocyanate, hexamethylene disocyanate, hydrogenated TDI and MDI. Suitable are also the emulsions of polycaprolactone, polylactic acid, ethylene/acrylic esters/ maleic anhydride terpolymers, polyalkylene carbonates, polyether/epoxide copolymers, polyester/polyether/epoxide copolymers, natural rubber latexes and mixture thereof.

When the coating agent is used in form of emulsion, the same can contain emulsifying agents and/or dispersion agents in amounts comprised between about 0.05 and 10% by weight, preferably 0.1 and 5%, more preferably 0.15% and 2%.

Emulsifying agents usable are, for example, the surfactants having a balance hydrophilic/lipophilic index (HLB) comprised between 3 and 25, preferably between 6 and 20. Particularly affective are the surfactants deriving from polyoxyethylene, polyoxypropylene or polyglycerol either directly esterific with fatty acids such as, for example, the polyoxyethylenes (4–20 mols) esterified with lauric, palmitic or stearic acids, or by esterification of polyethylated sugars such, for instance, the oxyethylated sorbitols (4–20 mols) esterified with 1–6 mols of fatty acid. Usable surfactants are also the oxyethylated nonylphenols, the ethers and esters of lanoline, the oleates of triethanol amine, the esters of polyglycerol with fatty acids, the ethers between polyoxyethylene and fatty alcohols such as, for example, stearyl or cetyl alcohol or cholesterol, PEG- tallow amine, PEG-castor oil, PEG- rosin resins.

Thickeners which can be used are, for instance, sodium carboxymethylcellulose, methylcellulose, natural rubbers, clay, rosinic resins.

Other additives typical for the emulsions are usable.

d) Coating of the foamed particles with powdered substances

It is possible to obtain the bonding of the foamed particles also using mouldable powders of hot melts applied electrostatically to the surface of the foamed particles.

Suitable are powders of polyoxymethylene, polylactic acid polymers or copolymers, polycaprolactone, obtained by milling at −150° C. and then sieved between 50 and 300 microns.

The application of the powders can be performed in a container in plastic material, for example polypropylene;

thereafter the particle mass is brought to a turbulence regime by insufflating dry air (this operation dehumidifies the particles and electrifies the same by effect of the rubbing against the container walls). At this point the dry air inlet is closed and a quantity of powder is loaded, from 0.1 to 3 g/100 ml particles, preferably from 0.2 to 1 g/100 ml. The mass is homogenized with a moderate air flow and then heated to a temperature higher than the melting point of the powder. The shaped article is then cooled for being removed from the mould.

An apparatus usable for preparing the shaped articles of the invention is schematically illustrated in FIG. 1. The modalities of use of the apparatus varies in function of the type of treatment carried out or will be carried out on the foamed particles to obtain the bonding of the same. The procedure herebelow described is referred to the coating cycle using aqueous emulsions and to the subsequent step of shaping the article. Alternatives will also be described herebelow Referring to the drawing of FIG. 1, the reference numerals (1) (3) and (9) indicate slidable separation walls which are pneumatically driven by means of opening/closure systems indicated with (2) (4) and (10) respectively. The wall (1) separates a silo feeding the foamed particles to the metering chamber (5); the wall (3) separates the metering chamber and the chamber (6) wherein the coating treatments are carried out; the wall (9) separates the pretreatment zone from the shaping zone.

With the separation wall (1) open, the foamed particles are fed to the metering chamber (5); then wall (1) is closed and, by opening wall (3) the particles are caused to fall into chamber (6); the wall is then closed and the nebulization unit (7) containing the emulsion of the coating agent, is started-up and is made to operate during a long enough time to introduce a prefixed amount of emulsion. In this stage, dry air is insufflated through the opening (8) to maintain fluid the particle mass and to remove the major part of the water introduced with the emulsion. Wall (9) is opened and the treated particles are caused to fall into the duct (11); the wall (8) is closed and the particles are pushed into the mould (13) by mean of the piston (12) which is kept in closing position with respect to the mould. This step is favored by a flowing of air through microholes in the piston, not represented in the drawing.

The particles are then heated to about 90° C. with air admitted through slots in the walls of the chamber of the mould; piston (17) is moved to obtain a compression of the particles and to give the final shape to the article; the shaped article is cooled through the microholes (16); the mould is opened and the article is recovered.

The same apparatus can use the particles containing in bulk the bonding agent, omitting the pretreatment stage in chamber (6); likewise for the particles treated by impregnation.

In the case of the powdered substances, the cycle is substantially identical to that of the emulsions, with the only difference that in place of the atomizer, a metering device for the powder is used. It is necessary that the chamber (6) and walls (3) and (6) are formed of plastic material, preferably polypropylene or polymethacrylate or a polyvinylchloride, to obtain the electrostatically charging of particles.

Regardless of the treatment to which the particles are subjected, procedures are preferred which allow to obtain fluid stockable masses and moveable by pneumatic systems.

This allows a greater flexibility in the use of the treated particles and remarkably broadens the range of the possible applications.

According to one of the preferred embodiments of the invention, sheets are prepared which need mould of simple realization requiring only the arrangement of holes for flowing hot or cold air and the possibility of obtaining compression ratios comprised between 50% and 500%, preferably from 30% and 300% allowing to obtain sheets having density comprised between 5 and 300 kg/M$^3$, preferably between 10 and 100 kg/m$^3$. The sheets are preferably formed of bonded strands or of particles having spheroidal form.

Another preferred utilization of the treated particles resides in using the same for packing articles having irregular shape also of remarkable size using procedures similar to the one currently in use with the polyurethane foams.

In this case, the pretreated foamed particles are bonded at temperatures lower than 100° C. preferably comprised between room temperature and 60° C., optionally using air.

The foamed particles can be inserted into a bag in conventional plastic material or in biodegradable water resistant or water soluble material. The bag can be placed into a box and optionally heated with hot air. The article to be packed is placed over the bag which is manually compressed to favour the bonding of the particles. A second bag prepared as the first one is placed over the article and manually pressed to get the shape of the latter.

Another preferred embodiment of the invention refers to coupled articles obtained by coupling foamed parts and paper, cardboard, films or sheets in biodegradable soluble material or conventional plastic material. The coupling can be performed after the shaping of the article or contemporaneously or successively. The same technique used for bonding the foamed particles are usable for the coupling. Continuous presses can be used with heating and cooling zones or irradiation heating systems with subsequent pression in continuous or also discontinuous presses can be used. Several sheets can be subjected to coupling.

Continuous presses of the Sandvik type can be used to produce foamed sheets of thickeness varying from 0.1 to 100 mm, preferably from 0.2 and 70 mm. In the thinnest forms, the sheets can replace foamed polyethylene films. Another embodiment of the invention refers to shaped parts sticked and/or sealed with the products used in the present invention to obtain complex shapes, optionally coupled with other materials.

A further embodiment of the invention residues in a light drawing of foamed sheets using male/female thermoforming processes, optionally with coupling of films or sheets. Another embodiment resides in the use in the foamed articles of fillers of different nature, including superabsorbing powders.

The shaped articles of the invention can find application as containers for medicines, cosmetics, ceramics, glasses, bottles, household appliance apparates, tools; partition sheets to fill void volumes, flexible articles such as envelopes for forwarding documents, containers for hot or cold beverages, preferably protected with a temperature and/or water resistant coating or film and all the products to be packed which require foamed protecting parts.

Inert fillers can be added to the foamed particles in quantity up to about 50% by weight, before or during the shaping step or during the coating step with the substances capable of promoting the bonding between the particles, Example of fillers are cellulose, cotton, shawing, popcorn, wood powder, cellulose powder, starch beet pulps; natural fibres such as cellulose fibres, jute, inorganic absorbing fillers, zeolites.

The following examples are given to illustrate and not to limit the invention.

CHARACTERIZATION

Resilience Test

This test is used in order to measure the material capability of recovering its initial shape after being submitted to the action of a force which causes it to get deformed.

A cylindrical container of 125 mm of diameter and 150 mm of height is filled with foamed particles which are squeezed by the flat sensor of a force gauge, moving forwards with the speed of 25 mm/minute. The sensor presses the particles by 33% of cylinder height, then returns back to its starting position. One minute later, the sensor performs a second particle compression treatment, according to the same modalities of the first one.

The resilience value, reported as a % value, is the ratio of the applied force for the first compression stroke, divide by the applied force for the second compression stroke, times 100.

Density $D_{app}$ (Kg/cm$^3$) Bulk density of foamed particles, calculated from the weight of a 5-liter volume of particles;

$d_{bulk}$ (Kg/cm$^3$) Pycnometric density of the individual foamed particles;

$d_{exp}$ (Kg/m$^3$) Pycnometric density of the foamed article.

EXAMPLE 1

A mixture was prepared with the following composition:
75%, by weight, of potato starch;
10%, by weight, of poly(vinyl alcohol) with the hydrolysis degree of 86%; and
15%, by weight, of water.

This composition was fed to a twin-screw extruded APV 2030 with diameter (d)=30 mm and length:diameter ratio [(L)/(d)]=30. The operating conditions were as follows:
screw revolution speed (rpm)=150:
temperature profile: 69° C./100° C./180° C./170° C./155° C.;
extruder throughput: 10 Kg/h.

The extrusion was so adjusted as to keep a total water content of about 14%.

The so obtained pellets, together with 0.5% of talc with average particles diameter of about 1.5 μm, were fed to a single-screw extruder ex OMC, with diameter (d)=40 mm and length:diameter ratio [(L)/(d)]=28, equipped with an extruder head with 4 nozzles with diameter (d)=0.8 mm and length:diameter ratio [(L)/(d)]<1.

The operating conditions were as follows:
screw revolution speed (rpm)=40;
temperature profile: 80° C./120° C./190° C./190° C./200° C.;
extruder throughput: 52 Kg/h.
head cutting blade revolution speed: 4,000 rpm.

Pellets of foamed material were obtained, the characteristics of which are reported in Table 1.

EXAMPLE 2

The operating procedure was the same as of Example 1, but a mixture with the following composition was used:
64%, by weight, of potato starch;
25%, by weight, of EVOH containing 44% of ethylene units by mol, with hydrolysis degree of 99.8%, and Mw=70,000;
10%, by weight, of water; and
1%, by weight, of glycerol monooleate.

The water content in the pellets is of approximately 10 %. The characteristics of the foamed pellets are reported in Table 1.

EXAMPLE 3

The operating procedure was the same as of Example 1, but a mixture with the following composition was used:
78%, by weight, of potato starch;
7%, by weight, of EVOH containing 44% of ethylene units by mol, hydrolysis degree of 99.8%, and mw=70,000;
8%, by weight, of poly(vinyl alcohol) with hydrolysis degree of 86%;
6%, by weight, of water; and
1%, by weight, of glycerol monooleate.

The water content in the pellets is of approximately 12%. The characteristics of the foamed pellets are reported in Table 1.

EXAMPLE 4

The operating procedure was the same as of example 1, but a mixture with the following composition was used:
69%, by weight, of potato starch;
10%, by weight, of polycaprolactone UC PCL 787;
5%, by weight, of Pellethane (2102-85AE9, a caprolactone-urethane block copolymer;
15%, by weight, of water; and
1%, by weight, of glycerol monooleate.

The water content in the pellets is of approximately 10 %. The characteristics of the foamed pellets are reported in Table 1.

EXAMPLE 5

The operating procedure was the same as of Example 1, but a mixture with the following composition was used:
75%, by weight, of potato starch;
10%, by weight, of a Dow Chemical's ethylene-acrylic acid copolymer containing 20% of acrylic units by mol; and
15%, by weight, of water.

The water content in the pellet is of approximately 10%. the characteristics of the foamed pellet are reported in Table 1.

EXAMPLE 6

The operating procedure was the same as of Example 1, but a mixture with the following composition was used:
75%, by weight, of potato starch;
10%, by weight, of cellulose acetate with substitution degree 2.5, plasticized with 20% caprolactone; and
15%, by weight, of water.

The water content in the pellets is of approximately 12%. The characteristics of the foamed pellet are reported in Table 1.

EXAMPLE 7

The metering chamber 5 of the apparatus illustrated in FIG. 1, of 2 liters of volume, was filled with foamed particles obtained from Example 3.

Then, by following the above specified procedure, the pellets were treated with a Vinavil NPC emulsion (from Enichem Synthesis) containing 50% poly(vinyl acetate), atomized by means of the atomizer unit 7.

The resulting manufactured articles was submitted to a post-drying treatment inside a chamber conditioned at 23° C. and relative humidity (RH)=30% during 15 hours.

The characteristics of the foamed product are reported in Table 2.

EXAMPLE 8

The operating procedure was the same as used in Example 7, but this time Vinavil NPC emulsion (from Enichem Synthesis) was used diluited 1:10 with water (water:Vinavil).

The characteristics of the foamed product are reported in Table 2.

EXAMPLE 9

The operating procedure was the same as used in Example 7, but this time Vinavil NPC emulsion (from Enichem Synthesys) was used diluted 1:5 with water (water:Vinavil).

The characteristics of the foamed product are reported in Table 2.

EXAMPLE 10

The operating procedure was the same as used in Example 7, but this time Vinavil NPC emulsion (from Enichem Synthesys) was used diluted 1:2 with water (water:Vinavil).

The characteristics of the foamed product are reported in Table 2.

EXAMPLE 11

The operating procedure was the same as used in Example 10, but with the difference that the foamed pellets used are those obtained from Example 2.

The characteristics of the foamed product are reported in Table 2.

EXAMPLE 12

The operating procedure was the same as used in Example 10, but with the difference that the foamed pellets used are those obtained from Example 1.

The characteristics of the foamed product are reported in Table 2.

EXAMPLE 13

The operating procedure was the same as used in Example 10, but with the difference that the post-drying treatment was carried out inside a chamber conditioned at 23° C. and relative humidity (RH)=55% during 15 hours.

The characteristics of the foamed product are reported in Table 2.

TABLE 1

| Example | Particle diameter (mm) | Dapp (kg/m$^3$) | Dbulk (kg/m$^3$) | Resilience (%) |
|---|---|---|---|---|
| 1 | 3.5 | 15 | 32 | 65 |
| 2 | 3.0 | 10 | 21 | 71 |
| 3 | 3.2 | 14 | 28 | 75 |
| 4 | 3.3 | 21 | 39 | 65 |
| 5 | 3.2 | 16 | 35 | 68 |
| 6 | 3.5 | 21 | 40 | 58 |

TABLE 2

| Example | Mould temperature (°C.) | Dexp (kg/m$^3$) | Longitudinal shrinkage (%) |
|---|---|---|---|
| 7 | 20 | 50 | 3 |
| 8 | 20 | 43 | 3.5 |
| 9 | 20 | 40 | 4 |
| 10 | 20 | 36 | 5 |
| 11 | 20 | 25 | 1 |
| 12 | 20 | 60 | 23 |
| 13 | 30 | 46 | 12 |

EXAMPLE 14

A mixture was prepared with the following composition:
75%, by weight, of potato starch;
10%, by weight, of poly(vinyl alcohol) with the hydrolysis degree of 68%; and
15%, by weight, of water.

This composition was fed to a twin-screw extruder APV 2030 with diameter (d)=30 and length:diameter ratio [(L)/(d)]=30. The operating conditions were as follows:
screw revolution speed (rpm)=150:
temperature profile: 69° C./100° C./180° C./170° C./155° C.;
extruder throughput: 10 Kg/h.

The vent was so adjusted as to keep a total water content of about 14%.

The so obtained foamable pellets, were added with 0.5% of talc with average particles diameter of about 1.5 μm, and were fed to a single-screw extruder Haake, with diameter (d)=19 mm and length:diameter ratio [(L)/(d)]=20, equipped with an extruder head with 9 nozzles with diameter (d)=0,4 mm and length:diameter ratio [(L)/(d)]=1.

The operating conditions were as follows:
screw revolution speed (rpm)=296;
temperature profile: 60° C./190° C./190° C./190° C.;
the extruder was equipped with a head cutting blade system the revolution speed of which was regulated to produce strands of 2.5-3 mm diameter and 40 mm length.

The characteristics of the foamed strands are reported in Table 3.

EXAMPLE 15

The operating procedure was the same as of Example 14, but a mixture with the following composition was used:
64%, by weight, of potato starch;
25%, by weight, of EVOH containing 44% of ethylene units by mol, with hydrolysis degree of 99.8%, and Mw=70,000;
10%, by weight, of water; and
1%, by weight, of glycerol monooleate.

The water content in the pellet is of approximately 10%.

The extruder head was equipped with 13 nozzles with diameter of 0.3 mm and the cutting speed was regulated to obtain foamed strands of 1.8 mm diameter and 20 mm length.

The characteristics of the foamed strands are reported in Table 3.

EXAMPLE 16

The operating procedure was the same as of Example 14, but a mixture with the following composition was used:

78%, by weight, of potato starch;

7%, by weight, of EVOH containing 44% of ethylene units by mol, hydrolysis degree of 99.8%, and mw=70,000;

8%, by weight, of poly(vinyl alcohol with hydrolysis degree of 86%;

6%, by weight, of water; and

1%, by weight, of glycerol monooleate.

The water content in the pellet is of approximately 12%. The characteristics of the foamed strands are reported in Table 3.

EXAMPLE 17

The operating procedure was the same as of Example 14, but a mixture with the following composition was used:

69%, by weight, of potato starch;

10%, by weight, of polycaprolactone UC PCL 787(Union Carbide);

5%, by weight, of Pellethane 2102-85AE9, a caprolacto-neurethane block copolymer;

15%, by weight, of water; and

1%, by weight, of glycerol monooleate.

The water content in the pellet is of approximately 10%. The characteristics of the foamed strands are reported in Table 3.

EXAMPLE 18

The operating procedure was the same as of Example 14, but a mixture with the following composition was used:

63.8%, by weight, of potato starch;

30%, by weight, of Estane 54351 (Goodrich)

5%, by weight, of water.

The water content in the pellet is of approximately 9%. The characteristics of the foamed strands are reported in Table 3.

EXAMPLE 19

The operating procedure was the same as of example 14, but a mixture with the following composition was used:

78%, by weight, of potato starch;

10%, by weight, of polyvinylalcohol with hydrolysis degree al 99%;

5%, by weight, of Estane 54351 (Goodrich)

7%, by weight, of water.

The water content in the pellet is of approximately 14%. The characteristics of the foamed strands are reported in Table 3.

EXAMPLE 20

The operating procedure was the same as in Example 14, but a mixture with the following composition was used:

75%, by weight, of potato starch;

10%, by weight, of a Dow ethylene-acrylic acid copolymer containing 20% by mols of acrylic units, and 15%, by weight, of water.

The water in the pellets is approximately 10%. The characteristics of the foamed strands are reported in Table 3.

EXAMPLE 21

The operating procedure was the same as in Example 14, but a mixture with the following composition was used:

75%, by weight, of potato starch;

10% by weight of cellulose acetate with substitution degree of 2.5, plasticized with 20% of caprolactone, and 15% by weight of water.

The water content of the pellets is about 12%. The characteristics of the foamed strands are reported in Table 3.

EXAMPLE 22

The metering chamber 5 of the apparatus illustrated in FIG. 1, of 2 liters of volume, was filled with foamed particles obtained from Example 3.

The temperature in the mould was 20° C.

Then, by following the above specified procedure, the pellets were treated with a Vinavil NPC emulsion (from Enichem Synthesis) containing 50% poly(vinyl acetate) diluted with water in a weight ratio water/Vinavil of 1:10, atomizing the emulsion by means of the atomizer unit 7.

The resulting manufactured article was submitted to a post-drying treatment inside a chamber conditioned at 23° C. and relative humidity (RH)=30% for 15 hours.

The foamed product is characterized by a density of 41 Kg/m$^3$ and by a longitudinal shrinkage of 3.1% with respect to the dimension of the mould.

EXAMPLE 23

The operating procedure was the same as used in Example 9, but with the difference that the foamed strands used are those obtained in Example 2.

The foamed product is characterized by a density 27 Kg/m$^3$ and by a longitudinal shrinkage of 3.1% with respect to the dimension of the mould.

EXAMPLE 24

The foamed strands obtain in example 15 were introduced into a metal cylinder of 50 mm diameter and 200 mm height, to obtain a level of 100 mm. The cylinder was transfer into a oven heated at 190° C. and maintained at this temperature for a time sufficient to obtain a residual water content in the foamed particles of about 0.5% by weight.

By means of a piston of the same diameter as the cylinder, the particles were compressed to 50 mm eight.

After cooling at room temperature, a cylindrical article was recovered having density of 19 Kg/m$^3$.

The particles forming the article were well sintered and the edge particles could not be removed by manual rubbing. The article had good cushion properties.

EXAMPLE 25

The foamed particles of example 18 were sintered according to the procedure of example 24.

The obtained article had a density of 21 Kg/m$^3$ and the edge particle could not be removed by manual rubbing and showed very good cushion properties.

EXAMPLE 26

The particles obtained in example 14 were put into a cylindrical body of 500 ml capacity closed at both ends with a metallic net with 1 mm meshes. The body was immersed in a 4% polycaprolactone (TONE 787-Union Carbide) solution in methylene chloride.

After 15 seconds, the cylinder was removed and left to drain for 5 minutes. The particles were then transferred into a polyethylene container of 5 liters capacity where they were subjected to energic ventilation with compressed air obtaining particles suitable for being sintered.

The sintering operation was carried out according to example 11, but operating at 90° C.

An article was obtained having density of 41 Kg/m$^3$ whose edge particles could not be removed by manual rubbing, and having excellent cushion properties.

EXAMPLE 27

Foamed particles (1 dm$^3$) obtained according to example 1 were loaded into chamber (6) of the apparatus of FIG. 1 and coated with an aqueous emulsion at 40% of a copolymer aliphatic polyester/aliphatic polyurethane deriving from isophorone diisocynate LS-519 of COIM. 1.5 ml of the emulsion were atomized into the chamber, corresponding to 0.6 kg. of active substance for every cubic meter of foamed particles.

After the treatment, the particles were kept under energic ventilation up to obtain a perfectly disegregated mass. The particles were then sent and closed into mould (15) where, through the microholes (16) made on the mould walls, were headed with air until to reach 90° C., after which the article was shaped by the compressing piston (17).

Keeping the piston in compression position, the article was cooled to 25°–30° C. insufflating air through the microholes. An article was obtained having density 35 Kg/m$^3$, whose edge particles could not be removed by manual rubbing and endowed of excellent cushion properties.

EXAMPLE 28

The procedure of example 27 is repeated using an emulsion of the same nature but deriving from hydrogenated MPI sold as LS-520 by COIM.

An article is obtained having density of 34 Km/m$^3$ whose edge particles could not be removed by manual rubbing, and endowed of excellent cushion properties.

EXAMPLE 29

20 liters of foamed particles obtained according to example 14, were loaded into a polypropylene container of 100 l capacity and treated with 35 ml of the emulsion LS-519 of COIM. Such an amount corresponds to 0.7 Kg. of active substance for every cubic meter of foamed particles. The emulsion was atomized on the foamed particles.

Once the atomization step was completed, the mass was kept for few minutes under turbulence regime by blowing air until the mass was well disegregated. The particles were loaded into a mould having rectangular section 20×30 cm. and 10 cm. weight with a piston of analogous section. The particles were compressed up to an eight of 20 mm, and after having fixed the piston at said height, the body is transferred into a oven at 100° C. After 30 min., the mould is withdrawn and cooled to room temperature always maintaining the piston in the compression stage. Once room temperature is reached, the mould is opened and the sheet is removal. The sheet which after removed from the mould has developed an elastic return to reach a thickness of 24 mm, had a density of 35 Kg/m$^3$. The sheet could withstand bending and the edge particles could not be removed by manual rubbing.

EXAMPLE 30

Foamed particles (1 dm$^3$) obtained as described in example 6 are loaded into chamber (6) in polymethacrylate of the apparatus of FIG. 1 and electrostatically charged by insuflating an air flow for about 3 min. By means of an apparatus of Venturi type, 2 g of powder of Estane 54351 Goodich were introduced, which was prepared by grinding the granules cooled in liquid nitrogen and saving the fraction of 200–300 microns. The introduction of the powder in chamber (6) was made through the opening of the atomizer, by substituting the latter with the Venturi apparatus.

Once the loading of the powder was completed, the whole was rapidly transferred into the mould, heated to 130° C. with air; compressed and cooled to room temperature. An article was removed having density of 62 Kg/m$^3$. The edge foamed particles could not be removed by manual rubbing and the article had excellent cushion properties.

EXAMPLE 31

Particles coated in the way described in example 29 are used for packing currently in use with the polyurethane foams.

The article to be packed was the cylinder and the piston used in example 11, which weighed about 2 Kg.

In a cardboard box of 20×30×3 size was introduced a bag in Mater-Bi (Novamont) having several microholes and containing as many as particles as to occupy about half the volume of the box. Air was insufflated into the box by means of an air dryer until the bag started melting.

The metal article was introduced at this point, compressing it against the bag until envelop the same. Separately, another bag in Mater-Bi containing as many as particles as the previous bag, was insufflated with hot air and compressed over the article in such a way as to envelop it completely and to occupy the remaining volume of the cardboard box.

After having coated the whole, the wrapping was opened verifying that the two bags stably reproduced the shape of the article and the whole had remarkable resilience.

EXAMPLE 32

Particles coated with an epoxidic resin emulsion ROLFIL C5/X/2 (Auschem) according to the procedure of example 29 were used as in example 31 but without using hot air. The treated particles were capable of being bonded by effect of only the manual pressure. The final packing envelope was suitable to protect the packed metal article.

EXAMPLE 33

The procedure of example 1 was followed but using a mixture having the following composition:

43 w % of potato starch;

50 w % of EVOH having content of ethylenic units 44% by mols and hydrolysis degree 99.8% and Mw=70000;

5 w % water;

0.5 w % PEG 20000;

1 w % nonylphenol polyethoxylated with 20 mols of ethylene oxyde.

The foamed particles had a bulk density of 0.02 g/m$^3$

The particles were bonded according to the procedure of example 30.

The shaped article had excellent cushion properties and very good water resistance.

EXAMPLE 34

The procedure of example 14 was followed but using a mixture having the following composition:

40 w % natural gelatin;

20 w % potato starch;

1 w % carboxymethyl cellulose;

20 w % of polyvinylalcohol Goselmol;

18 w % water.

The foamed particle were agglomerated according to the procedure of example 23.

The shaped article showed good cushion properties.

EXAMPLE 35

3 sheets obtained according to the procedure of example 29 are bonded together by humidifying with water the surface to be bonded. The bonded sheets formed a panel of about 70 mm thickeness, having excellent cushion properties.

EXAMPLE 36

A sheet obtained according to example 29 and a cardboard sheet were bonded together with a Vinavil NPC (Enichem Syntesis) emulsion containing 50% polyvinylacetate.

EXAMPLE 37

A polyactide film 20 micron thick (molecular weight of polymer 100000) was bonded together with a foamed sheet prepared according to example 16, using the polyurethane emulsion of example 14.

EXAMPLE 38

A sheet like that of example 29 but with thickeness of 1.2 cm and density of 30 Kg/m$^3$ was leithly drawn at the corners using a male-female mould and heating at about 80° C. The obtained article had a density of about 40 Kg/m$^3$ and a shape of a tray that could be used as food container.

EXAMPLE 39

The procedure was the same as in example 38 with the difference that the surface of the sheet that will become concave, was added with powder of polycaprolactone. The male of the press was tefloned. A tray was obtained endowed of an impermeable surface and having density of 44 Kg/m$^3$.

EXAMPLE 40

A paper sheet was covered with a thin layer of about 0.7 cm of particles prepared according to example 1 treated as in example 27. The system was irradiation heated to about 80° C. and was pressed interposing another very thin paper sheet between the plate of the press and the sheet covered with foamed particles. The thickeness of the obtained flexible laminate was of about 0.3 cm. The product could be used for preparing envelopes for forwarding documents. The experiment was repeated using one of the two paper sheets, laminated with a film of Mater-Bi Z 101 U to give impermeability to the system. The thus obtained system was compostable and also repulpable and flushable.

EXAMPLE 41

A sheet was obtained according to example 29, introducing a superabsorbing powder (about 10% by weight respect to the foamed particles) immediately after the treatment with the polyester/polyurethane emulsion and before heating under optimal conditions. The powder resulted bound to the particles. The resultant sheet had excellent absorbing properties.

EXAMPLE 42

A sheet was prepared according to example 29 adding, during the bonding step, 30% by weight with respect to the particles, cellulose fibres treated in the same way as the foamed particles. The obtained sheet showed good cushion properties and high rigidity.

EXAMPLE 43

The surface in Teflon of a metal plate was covered with a thin layer of about 0.7 cm of foamed particles obtained according to example 14 but having a strand size of 1.8 mm diameter and 20 mm length. A second metal plate was laid on. The system was inserted in a press heated to 90° C. and was pressed to obtain a thickeness of the foamed article of 3 mm for a time of 5 min. The system was cooled under pressure for few minutes. A flexible sheet was obtained having properties similar to those of a foamed polyethylene film.

TABLE 3

| Example | Particle diameter (mm) | Strand length (mm) | d/app (Kg/m$^3$) | d/bulk (Kg/m$^3$) |
|---|---|---|---|---|
| 14 | 2.7 | 40 | 12 | 26 |
| 15 | 1.8 | 20 | 10 | 20 |
| 16 | 1.9 | 21 | 12 | 25 |
| 17 | 2 | 20 | 19 | 37 |
| 18 | 1.8 | 10 | 11 | 22 |
| 19 | 2.1 | 16 | 13 | 28 |
| 20 | 1.9 | 20 | 14 | 32 |
| 21 | 1.8 | 8 | 20 | 41 |

We claim:

1. Biodegradable foamed articles having a density of from 5 to 300 kg/m$^3$, formed of agglomerated foamed particles comprising:

(a) 30 to 98.5% by weight of a thermoplastic natural polymer which, when converted into the thermoplastic state, is capable of absorbing water in an amount of at least 15% by weight;

(b) 1.5 to 70% by weight of a thermoplastic polymer, and (c) 0 to 20% by weight water, based on the weight of the composition;

wherein the particles are agglomerated by means of a bonding agent capable of modifying the surface characteristics of the particles to render them bondable when subjected to compression.

2. Biodegradable foamed articles according to claim 1, wherein the bonded foamed particles comprise:

(a) 30 to 98.5% by weight of a thermoplastic starch;

(b) 1.5 to 70% by weight of thermoplastic polymer; and (c) 0 to 20% by weight water, based on the weight of the composition.

3. Biodegradable articles according to claim 1, wherein the particles are in spheroidal form or are strand-shaped with a diameter from 0.5 to 50 mm and a length greater than 2 diameters.

4. Biodegradable foamed articles according to claim 1, wherein the thermoplastic polymer is selected from the group consisting of polyvinyl alcohol in its various degrees of hydrolysis, aliphatic polyesters, aliphatic polyurethanes, polyureas, polyalkylenoxides, polyester/polyurethane copolymers, polyester/polyurethane/polyurea copolymers, aliphatic polyamides, carboxymethylcellulose, caseinates, polyaspartates, and polyglycerols, and the copolymers of ethylene with a monomer selected from the group consisting of vinyl alcohol, vinyl acetate, acrylic or methylacrylic acids.

5. Biodegradable foamed articles according to claim 1, wherein the bonding agent is applied to the surface of the particles.

6. Biodegradable foamed articles according to claim 2, wherein the bonding agent is applied to the surface of the particles.

7. Biodegradable foamed articles according to claim 3, wherein the bonding agent is applied to the surface of the particles.

8. Biodegradable foamed articles having a density from 5 to 300 kg/m$^3$, formed of agglomerated particles comprising:
    (a) 30 to 98.5% by weight of thermoplastic starch;
    (b) 1.5 to 70% by weight of a thermoplastic polymer selected from the group consisting of polyvinyl alcohol, aliphatic polyesters, aliphatic polyurethanes, polyureas, polyalkylenoxides, polyester/polyurethane copolymers, polyester/polyurethane/polyurea copolymers, aliphatic polyamides, carboxymethylcellulose, caseinates, polyaspartates, and polyglycerols, and the copolymers of ethylene with monomers selected from the group consisting of vinyl alcohol, vinyl acetate, acrylic or methacrylic acids; and
    (c) 0 to 20% by weight water based on the weight of the composition;
wherein the foamed particles are agglomerated by means of a bonding agent applied to the surface of the particles.

9. Biodegradable foamed articles according to claim 8, wherein the bonding agent is selected from the group consisting of polyvinyl acetate and its copolymers, polyurethane/aliphatic polyester, polyurea/aliphatic urethane, polyurea/polyester, polyurea/polyethylene copolymers, ethylene/vinylalcohol copolymers, aliphatic polyeseters, polyvinyl alcohol modified to various degrees by hydroylsis, natural rubbers, and epoxy resins.

10. Biodegradable foamed articles having a density from 5 to 300 kg/m$^3$, formed of sintered foamed particles having a composition comprising:
    (a) 30 to 98.5% by weight of a thermoplastic starch; and
    (b) 1.5 to 70% by weight of a thermoplastic polymer capable of forming "V" type complexes with amylose.

11. Biodegradable foamed articles according to claim 10, wherein the polymer capable of forming "V" complexes with amylose is selected from the group consisting of urethane/aliphatic esters, ethylene/acrylic acid esters/maleic anhydride terpolymers, ethylene/vinyl alcohol, polyurea/ester/urethane copolymers.

12. Biodegradable foamed articles having a density of from 5 to 300 kg/m$^3$, formed of agglomerated particles comprising:
    (a) from 30 to 98.5% by weight of a thermoplastic starch having an intrinsic viscosity lower than 1.3 dl/g;
    (b) from 1.5 to 70% by weight of a thermoplastic polymer; and
    (c) 0 to 20% of water by weight with respect to the weight of the composition.

13. Biodegradable foamed articles according to claim 12, wherein the thermoplastic polymer is selected from the group consisting of polyvinyl alcohol, aliphatic polyesters, aliphatic polyurethanes, polyureas, polyalkylenoxides, polyester/polyurethane copolymers, polyester/polyurethane/polyurea copolymers, aliphatic polyamides, carboxymethylcellulose, caseinates, polyaspartates, and polyglycerols, and the copolymers of ethylene with monomers selected from the group consisting of vinyl alcohol, vinyl acetate, acrylic or methacrylic acids.

14. Biodegradable foamed articles according to claim 12, wherein the particles are agglomerated by means of a bonding agent capable of modifying the surface characteristics of the particle to render the same bondable when subjected to compression.

15. Biodegradable foamed articles according to claim 12, wherein the particles are agglomerated by means of a bonding agent selected from the group consisting of polyvinyl acetate and its copolymers, polyurethane/aliphatic polyester, polyurea/aliphatic urethane, polyurea/polyester, polyurea/polyethylene copolymers, ethylene/vinylalcohol copolymers, aliphatic polyeseters, polyvinyl alcohol modified to various degrees by hydroylsis, natural rubbers, and epoxy resins.

16. Biodegradable foamed articles according to claim 12, wherein the thermoplastic polymer is a polymer capable of forming "V" type complexes with amylose, and wherein the agglomerated particles are sintered.

17. Biodegradable foamed articles according to claim 12, wherein the thermoplastic polymer is a polymer capable of forming "V" type complexes with amylose and is selected from the group consisting of urethane/aliphatic ester, ethylene/acrylic acid esters/maleic anhydride terpolymers, ethylene/vinyl alcohol, polyurea/ester/urethane copolymers.

18. Biodegradable foamed articles according to claim 1, wherein the foamed particles contain a nucleating agent.

19. Biodegradable foamed articles according to claim 8, wherein the foamed particles contain a nucleating agent.

20. Biodegradable foamed articles according to claim 10, wherein the foamed particles contain a nucleating agent.

21. Biodegradable foamed articles according to claim 12, wherein the foamed particles contain a nucleating agent.

* * * * *